May 13, 1952

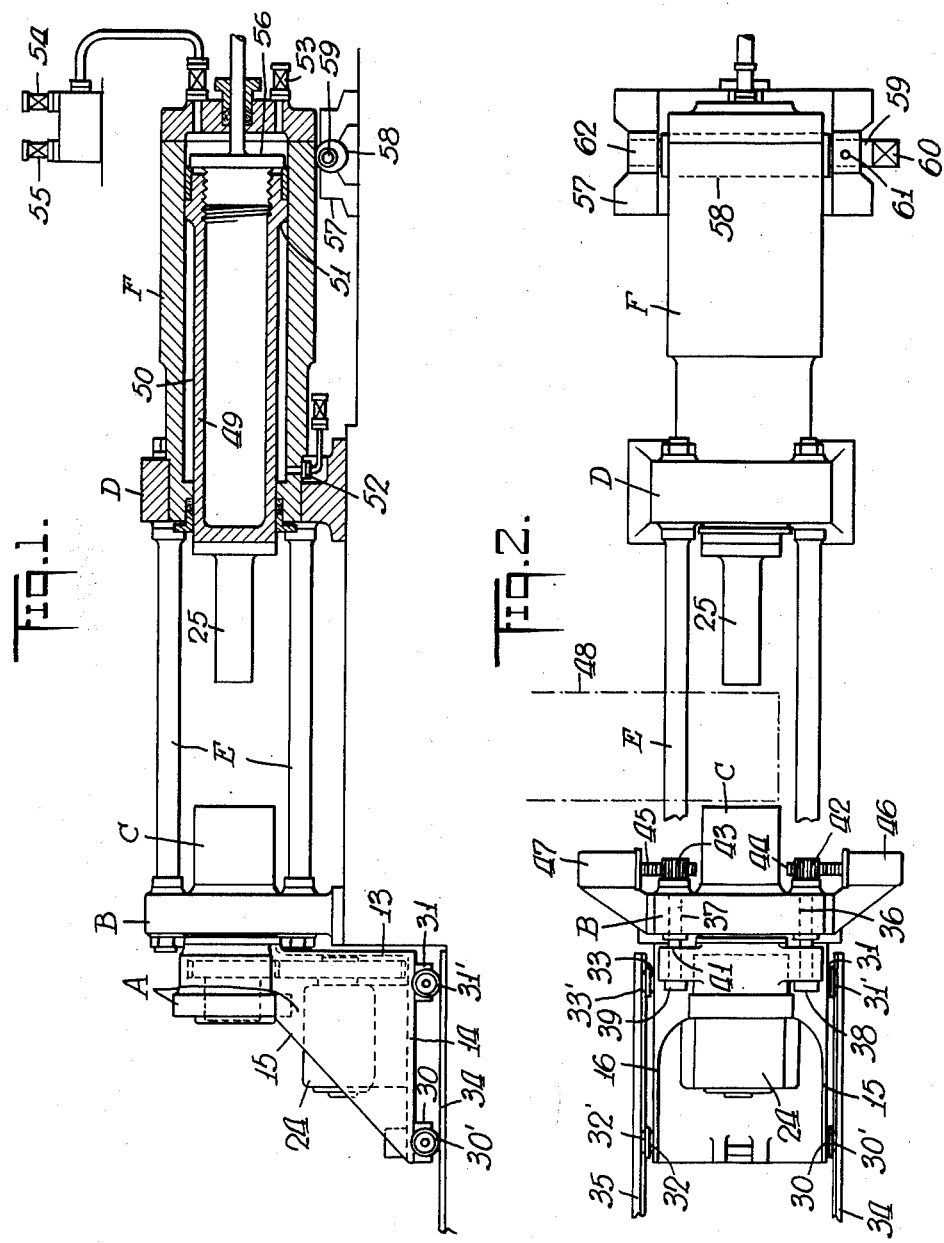

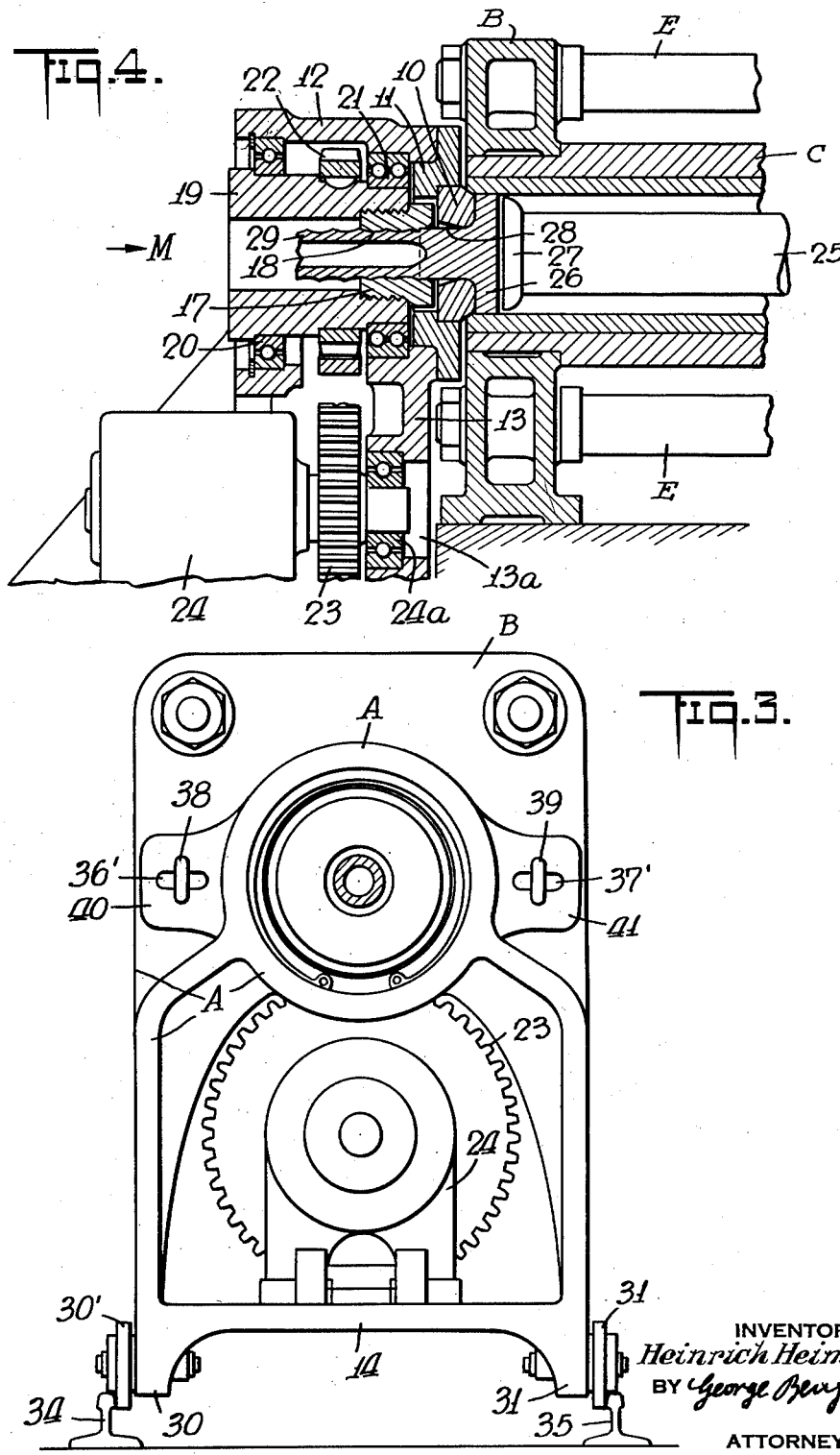

H. HEIMANN 2,596,552

MACHINE FOR PRODUCING TUBES OR OTHER
HOLLOW CYLINDRICAL ARTICLES

Filed Oct. 24, 1944

INVENTOR
Heinrich Heimann
BY George Benjamin

ATTORNEY

Patented May 13, 1952

2,596,552

UNITED STATES PATENT OFFICE 2,596,552

MACHINE FOR PRODUCING TUBES OR OTHER HOLLOW CYLINDRICAL ARTICLES

Heinrich Heimann, New York, N. Y.

Application October 24, 1944, Serial No. 560,174

8 Claims. (Cl. 29—33)

This invention relates to an extrusion press for producing seamless tubes or other hollow cylindrical articles from metal or any other deformable material.

The usual extrusion process for tubes, mostly performed in horizontal presses, requires billets provided with a central axial hole which is made either in advance, or by piercing in situ.

Furthermore such process requires equal resistance to deformation throughout the cross sections of the billets, and a precise alignment of extrusion ram and mandrel with billet container and die. (See e. g. "Extrusion of Metals" by Claude E. Pearson, 1944, p. 115.)

The main object of the present invention is a new machine for extruding tubes and other hollow articles from solid imperforate billets which, in further distinction from the known production, need not be passed through a narrow gap between the wall of the die opening and a mandrel.

In the new machine an imperforate billet, in the manner usual for producing rods, is extruded in the form of a rod, and this rod, directly behind the extrusion die, while being held against rotation, is gripped by a second or revolving die rotating around the axis of the rod and provided with means impelling and advancing the surface layers of the rod with an axial velocity greater than the velocity of the rod at its point of entrance into the rotating die.

Thereby a flow of material, in accordance with the law of continuity, ensues from the core of the rod to its surface, in an amount making up for the difference of volume between the outer layers of material entering the revolving die with a relatively small axial velocity, and the outer layers leaving the revolving die with a relatively high axial velocity.

By the so obtained quickened axial advance of the outer layers of the rod the latter is transformed into a tube.

In the revolving die, thus, a "skinning" action on the rod is performed. This die, accordingly, will be called henceforth the skinning die. From the degree of difference between entrance velocity and exit velocity of the material in the skinning die depends, as stated above, the amount of material flowing from the core of the rod to its surface and, therefore, the inner diameter of the tube or hollow article to be produced.

By varying the R. P. M. of the skinning die during the operation the inner diameter of the body or article leaving the die can be varied accordingly, with the result that a hollow article with wall thicknesses differing from beginning to the end of the extrusion can be produced. Even a hollow body with completely closed front and rear ends may be produced by temporarily diminishing the R. P. M. of the skinning die according to the condition that in the closed end zones of the article to be produced the exit velocity of the material in the skinning die has to be equal to the entrance velocity i. e. to the rod extrusion velocity.

From the foregoing it should appear clearly that, as hinted above, the rod in the skinning die has to be firmly secured against rotation with the latter. This can be done by a separate gripping head firmly secured against rotation or, if the skinning die is arranged directly behind the extrusion die, by the rigidly fixed extrusion die itself, in which the rod cannot rotate due to its high friction against the surface of the extrusion die, so that the extrusion press functions as a feeding and gripping device.

It is obvious that a certain slip of material in the skinning die cannot be avoided in spite of such friction and that, therefore, the R. P. M. of the skinning die have to be increased accordingly to produce the required axial flow of material.

To create the described quicker axial flow of the material the skinning die can be formed in many different ways. The simplest way is to use a skinning die in the form of a revolving nut, the inner screw threads or riflings of which grip the non-revolving material and drive its surface layers in axial direction with a velocity depending upon the pitch of the threads or riflings and the number of revolutions but greater than the extrusion velocity. Such a die may exert on the surface of the rod a relatively high friction in peripheral direction.

To reduce the friction the rotary skinning die may act upon the surface of the rod by symmetrically arranged planetary pressure rollers. These rollers can be arranged with their axes skewed or oppositely inclined to the axis of the rod in a manner similar to that found in tube rolling mills with non-planetary rollers. But these planetary rollers can also have their axes parallel to the axis of the rod and, in this case, are provided with male screw threads for creating the axial flow of material by the rolls rotating around their axes, and simultaneously spinning around the axis of the rod.

Further objects of the invention will be set forth in the following specification with illustrative drawings. In these drawings several embodiments of apparatus for forming tubes or hollow bodies according to the new method are shown by way of example.

In the drawings:

Figure 1 shows the extrusion press with axially shiftable die sets in front of it, partly in side view, partly in longitudinal section;

Figure 2 shows the same press in plan view, the strain rods at the front end partly broken away to show the underneath arranged drives for the means locking the die set to the front head of the press;

Figure 3 shows a front view of the press according to Figure 1;

Figure 4 shows in longitudinal section one embodiment of the die set with ordinary rigidly fixed stationary extrusion die and revolving skinning die in front of the container for the material;

Figure 5:
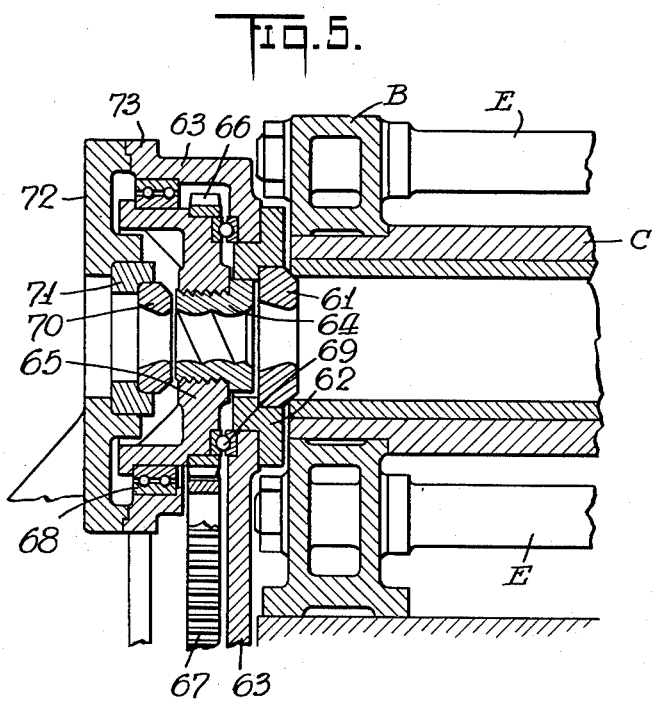
Figure 5 shows another embodiment of the die set in front of the container, in longitudinal section.

A die set A in front of the front head B of the extrusion press (Figures 1 and 2) is arranged in the center of the press and can be shifted in axial direction for reasons explained further below.

On the rear side of the front head B of the press is arranged a container C for the billet to be worked upon. In the rear head D of the press frame, connected to the front head B by the well known strain rods E, is rigidly arranged the stationary hydraulic press cylinder F. The die set A, as shown in Figures 3 and 4, comprises an extrusion die 10 rigidly fixed in a die holder ring 11 which itself is abutted against a ring-like bolster body 12 which, with its front wall 13, bottom 14 and side walls 15 and 16 (see Figures 1 and 2) forms a rigid frame.

In front of the extrusion die 10 and inside the bolster body 12 is arranged the skinning die 17 provided with internal screw threads 18 of the appropriate pitch depending upon the R. P. M. of the skinning die. The skinning die is e. g. screwed into the tube like rotary die holder 19 in such a way that the reaction of the work piece on such die, accelerating axially the surface layers of the metal, tends to tighten such screw connection. The die holder 19 is formed as a hollow shaft mounted in the cylindrical bolster body 12 by means of ball bearings 20 and 21 adapted to take up the axial thrust exerted on the skinning die holder 19 in the direction of the arrow M by the skinning process. The skinning die 17 and its holder 19 are rotated by a pinion 22 keyed on the die holder 19 and driven by a gear 23 on the shaft of a motor, for example an electric motor 24.

Said shaft is mounted in a bearing, e. g. a ball bearing 24a, in the front bore 13a of the die set frame A.

As can be seen from Figure 4 the press ram 25 extrudes the imperforate billet 26 by means of the follower disk 27 through the rigidly fixed stationary die 10 in the form of a rod-like body 28 which, by the rotary nut-like skinning die 17 with screw threads 18 accelerating the outer layers of the material, is then deformed into a hollow tube-like body 29, whose wall thickness can be changed by changing the speed of the motor 24, or by changing the ratio of the gearing 22, 23. The die set A has to be securely locked against the press head B during the extrusion process. This can be done by special means shown in Figures 2 and 3 and described in greater detail further below.

To shift the die set A in axial direction its frame is provided with brackets 30, 31, 32 and 33, for rollers or wheels 30′, 31′, 32′, 33′, running on rails 34 and 35 respectively, arranged in front of the press head B. In the outward or retracted position of the set A the not extrusible end or "lost head" of the billet can be removed from the container C. During the extrusion the die set has to be reliably locked to the front head B. This is done, f. i. (see Figures 2 and 3), by locking spindles 36 and 37 turnable in bores of the front head B and provided with oblong head 38 and 39. The spindles 36 and 37 go freely through oblong bores 36′, 37′ of lugs 40 and 41 of the die set frame. When the longitudinal axes of the spindle heads 38 and 39 coincide with the longitudinal axes of the bores 36′, 37′ said heads pass freely through said bores, and the die set A can be retracted in axial direction from the front head B of the press. If the spindles 36 and 37 are turned around 90° the die set A is locked with the front head B of the press by said spindle heads 38, 39.

If the front surfaces of the lugs 40 and 41 are sloped, and the abutting surfaces of the heads 38 and 39 are sloped correspondingly, then, by turning the spindles 36 and 37, axial pressure, i. e. a wedge effect, is exerted which assures tight locking of the die set A with the front surface of the presshead B.

The spindles 36, 37 can be turned through 90° by pinions 42 and 43 (Figure 2) keyed on the free ends of these spindles and meshing with racks 44 and 45 connected with pistons in hydraulic control cylinders 46 and 47, symmetrically arranged on opposite sides of the press head B.

The hydraulic cylinder F for extruding the billet is so arranged that the ram 25 in its rearward position has a distance from the container C slightly longer than the billet which is approximately of the same length as the container, so that in this position of the ram a billet can be freely fed between the container and the ram from a furnace on a conveyor 48, shown only diagrammatically in dotted lines in Figure 2.

The piston 49 in the hydraulic chamber 50 of the hydraulic cylinder F is a differential piston. The differential shoulder 51 of the piston is kept constantly under medium pressure by a fluid entering this cylinder through a connection 52 at its front end. The rear end of the cylinder can be brought selectively under low pressure, medium pressure, or high pressure of a fluid, f. i. oil, by connecting an inlet 53 with a low pressure source, or an inlet 54 with a medium pressure source or an inlet 55 with a high pressure source. None of these pressure sources is shown.

The controlling means of these connections, f. i. electrically controlled valves are of well known type and, therefore, need not be described here.

When the rear surface 56 of the piston is under low pressure the force exerted by the medium pressure on the shoulder 51 overcomes the force exerted on the surface 56 by the low pressure so that the piston 49 is moved backward, i. e. to the right, into its end position for making possible feeding in a new billet. When the low pressure on surface 56 is changed to medium pressure the force exerted on the larger surface 56 overcomes the force exerted on shoulder 51, the friction of the piston in the cylinder and the friction of the billet on its supporting surface, so that the billet is pushed into the container C and against the front surface of the locked die 10.

When the medium pressure on surface 56 of the piston is changed to high pressure sufficient force is exerted on surface 55 to extrude the billet with the required axial velocity through the opening of the stationary extrusion die 10 into the mouth of the rotary skinning die 17.

This arrangement requires a relatively long hydraulic cylinder F but simplifies the transfer of the billet to the press and into the container C and makes for an easy assembly and dismantling of container and press head. Furthermore, the pressure against which the rear side, i. e. the right hand end, of the piston has to be sealed equals only the difference between high pressure and medium pressure while at the front or left hand end the piston has only to be sealed against medium pressure. This simplifies the sealing means of the differential piston in its cylinder.

As can be seen from Figure 1 the hydraulic cylinder F is locked with its forward end of diminished diameter in the press head D. For supporting the cylinder at its rear end and for exactly aligning it with the axis of the press there is provided underneath the rear end of the cylinder a frame 57, with a roll 58, eccentrically keyed on a shaft 59 rotatably adjustable in bearings of frame 57 e. g. by a lever (not shown) attachable to the square end 60 of the shaft. The eccentric roll 58 can be locked in any position by set screws 61 and 62.

As can be seen from Figure 4 the product, in the form of the tube like body 29 leaving the skinning die because of the action of the screw threads 18, has screw like threads or welts on its outer surface. If an even and smooth cylindrical outer surface is required the die set according to Figure 5 may be used.

In this embodiment the extrusion die 61, rigidly locked with the front surface of the container C, is held in the holder 62, which is arranged in the rigid frame 63 aligned with container C. The skinning die 64, of the same construction as in Figure 4, is screwed into the holder 65 rotatable by means of wheels 66, 67 by an electric motor (not shown) arranged in the die set frame.

A radial ball bearing 68 and a thrust ball bearing 69 ensure the exact concentricity of holder 65 and frame 63. In front of the rotary skinning die 64 is arranged a second fixed die 70 whose diameter equals, or is slightly smaller than, the smallest diameter of the screw threads of the skinning die 64. This rigid fixed die 70 is arranged in a die holder 71 aligned in the rigid cover plate 72 screwed to a flange 73 of the die set housing 63.

In this way the screw threads on the tubular product leaving the skinning die 64 are levelled or ironed out so that the surface of the tube produced is smooth, cylindrical and even. The arrangement of the fixed die 70 in front of the skinning die 64 has the further advantage that the extruded article or product is held against rotation by said die 70 in addition to being held by the die 61.

Figure 6:
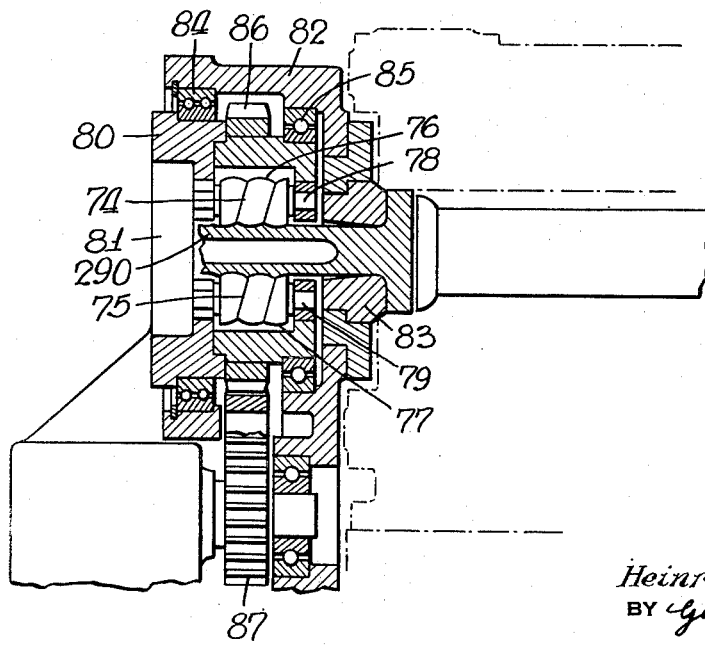
Figure 6 shows a further embodiment of the die set in front of the container, in longitudinal section.

The arrangement of the die set according to Figure 6 is similar to that of Figure 4, with the difference that instead of the skinning die provided with internal threads or riflings are provided two or more rollers 74, 75 having on the surface threads 76 and 77 of appropriate pitch. These rollers are rotatably mounted with their axes 78 and 79 in bearings of the rotatable frame 80.

This frame through whose bore 81 the tubular or hollow product is extruded is abutted against the rigid housing 82 of the fixed die 83 by radial thrust ball bearings 84 and 85, and is provided with a pinion 86, driven by means of a gear 87, e. g. by an electromotor (not shown).

It is obvious from the foregoing that by revolving the frame 80 the rollers 74 and 75 are driven in a planetary manner around the extruded body 290 pressed axially through the space between said rollers and at the same time the latter rotate around their axes because of the friction of the rollers on article 290. Thereby the surface layers of the extruded article are impelled with an axial velocity greater than the axial velocity of the extruded body advancing through the stationary die 83 so that again the skinning effect, as described above, takes place. The friction between the skinning die and the surface of the extruded article is diminished here by the rollers, and the slip of said article relative to the skinning die is diminished correspondingly.

In the machine of Figure 6 the rollers 74 and 75, the axes of which are parallel to the axis of the press, may be replaced by skewed unthreaded rollers which act in the manner well known in the art of producing tubes and, therefore, need not be shown or described in detail.

What I claim is:

1. A machine for making hollow bodies from a solid billet of metal or other plastically deformable material, comprising an extrusion press provided with an extrusion die and a rotating die arranged directly behind the extrusion die, and means for maintaining the rotating die axially fixed relatively to the extrusion die, said rotating die having portions inclined to its center line and positioned to exert pressure on the surface of the extruded rod and means for rotating the rotating die at a sufficient speed to impart an axial velocity to the extruded rod exceeding the velocity of extrusion.

2. A machine as set forth in claim 1 wherein the rotating die is in the form of a nut the threads of which constitute the portions inclined to its center line.

3. A machine of the character described and as set forth in claim 1, the rotating die comprising a power-driven rotary frame with threaded rollers arranged parallel to the center line of the frame and engaging with their threads the surface of the extruded rod under pressure and at an axial velocity surpassing the exit velocity of the rod from the extrusion die.

4. A machine as set forth in claim 1 wherein the extrusion press is provided with a movable frame which is separable from but locked to the other parts of the press and wherein the extrusion die and the rotating die are fixedly connected to each other on said frame.

5. A machine for making hollow bodies from a solid billet of metal or other plastically deformable material, comprising an extrusion press provided with an extrusion die; a rotating die arranged directly behind the extrusion die and integrally connected to it in axial direction, said rotating die having portions inclined to its center line and acting with pressure on the surface of the extruded rod at an axial velocity surpassing the extrusion velocity; a non-rotating unthreaded die arranged adjacent the exit of the rotating die and acting with uniform pressure around the surface of the hollow body leaving the rotating die.

6. A machine for making hollow bodies from a solid billet of metal or other plastically deformable material, comprising an extrusion press provided with a stationary frame and an extrusion die and rotating die, one arranged directly adjacent the other and both integrally connected to each other in axial direction, the rotating die having portions inclined to its center line and acting with pressure on the surface of the extruded rod at an axial velocity surpassing the velocity of the rod leaving the extrusion die, a movable frame for holding both the extrusion die and the rotating die, said stationary frame being provided with spindles adapted to be turned at an angle of approximately 90°, said spindles having oblong heads corresponding to oblong holes in the movable frame so that in one end position the oblong heads of the spindles are aligned with the oblong heads of the frame, while in the other end position they lock the movable frame of the die to the frame of the extrusion press.

7. A machine as set forth in claim 6, the heads of the locking spindles being provided with wedge surfaces co-operating with corresponding wedge surfaces on the frame of the extrusion press and being turned selectively into and out of alignment with the oblong holes in the frame by hydraulic cylinders.

8. A machine for making hollow bodies from a solid billet of metal or other plastically deformable material, comprising an extrusion press provided with an extrusion die and an axially closely adjacent to it arranged rotating die, said extrusion press being further provided with a ram driven by a differential piston, the side of said piston for forward stroke being selectively connected by controlling valves to three hydraulic conduits for low, medium and high pressure, respectively, while the opposite side of said piston is permanently connected to the conduit of medium pressure.

HEINRICH HEIMANN.

REFERENCES CITED

The following references are of record in the file of this patent:

UNITED STATES PATENTS

| Number | Name | Date |
|---|---|---|
| 361,955 | Mannesmann | Apr. 26, 1887 |
| 770,741 | Moshier | Sept. 20, 1904 |
| 1,011,522 | Summey | Dec. 12, 1911 |
| 1,945,877 | Bonte | Feb. 6, 1934 |
| 2,026,979 | Jones | Jan. 7, 1936 |

FOREIGN PATENTS

| Number | Country | Date |
|---|---|---|
| 137,578 | Great Britain | Jan. 22, 1920 |